United States Patent [19]
Sakai et al.

[11] 3,808,485
[45] Apr. 30, 1974

[54] MANIPULATOR

[75] Inventors: Teruo Sakai, Yono; Masato Hara, Tokyo, both of Japan

[73] Assignee: Asahi Kogaku Kogyo Kabushiki Kaisha, Tokyo-to, Japan

[22] Filed: July 10, 1972

[21] Appl. No.: 270,507

[30] Foreign Application Priority Data
July 15, 1971  Japan.................................. 46-52711

[52] U.S. Cl.................... 318/480, 318/313, 318/640
[51] Int. Cl. ............................................. G05b 1/06
[58] Field of Search ............ 318/480, 313, 640, 577

[56] References Cited
UNITED STATES PATENTS

| | | | |
|---|---|---|---|
| 3,465,221 | 9/1969 | Arce et al. | 318/480 X |
| 3,096,444 | 7/1963 | Seward | 318/313 X |
| 3,311,803 | 3/1967 | Schulz | 318/313 X |
| 3,414,790 | 12/1968 | Auld | 318/313 |
| 3,514,685 | 5/1970 | Burgess | 318/313 |

Primary Examiner—B. Dobeck
Attorney, Agent, or Firm—Christie, Parker & Hale

[57] ABSTRACT

A manipulator for registering a first element relative to a second element. A movable member has an initial position and is adapted to be moved from the initial position in a predetermined relative relationship to the desired position of the first element. A light source and a light receiver are cooperatively arranged relative to each other. A light manipulating means passes light from the source to the light receiver. A light modulating means is characterized in that a varying light intensity is passed thereby to the light receiver at different positions on the light modulating means. Relative movement is provided between the light modulating means and the combination of the light source and the light receiver. A direction indicator is coupled to the movable member for providing a signal indicating direction of movement of the member from its initial position. A motor is responsive to a control signal for moving the first element at a speed and in a direction predetermined by an applied control signal. Means is coupled to the signals from the light modulator and direction indicator for providing a control signal to the motor for direction and speed control.

14 Claims, 21 Drawing Figures

Fig - 3
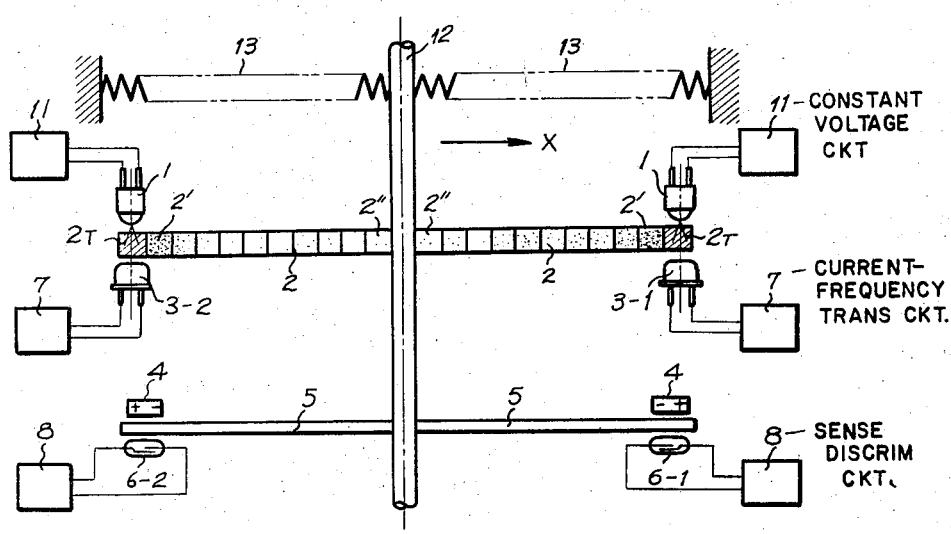
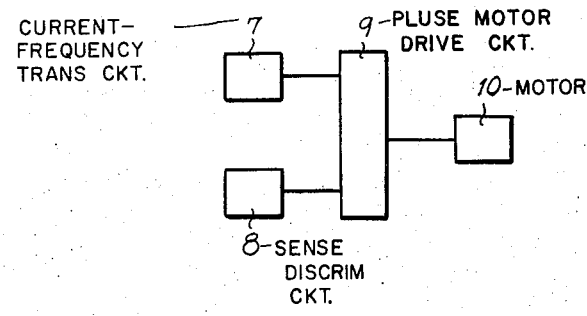

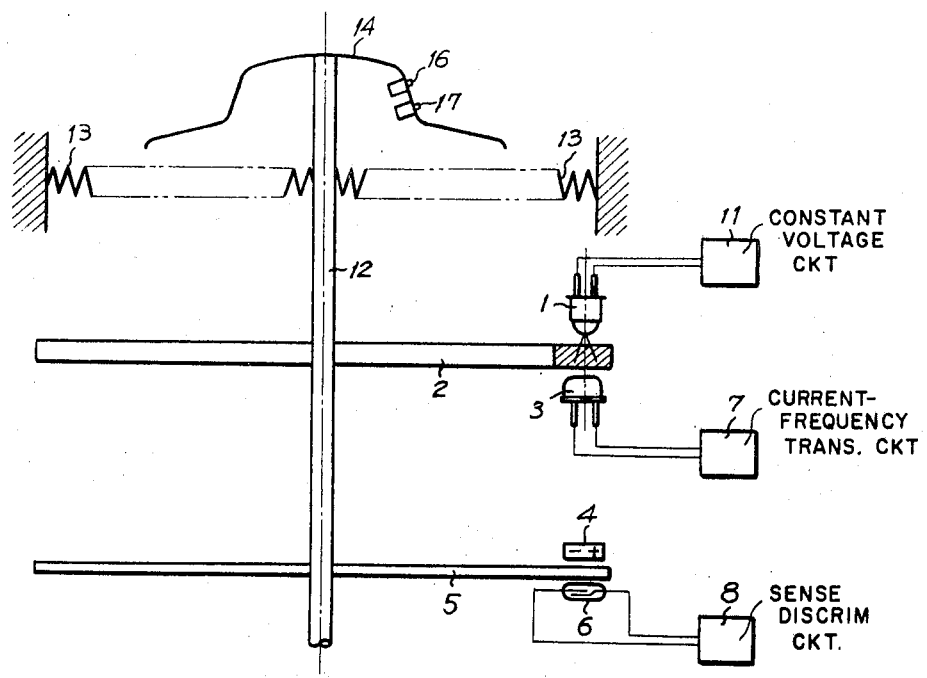
Fig. 7
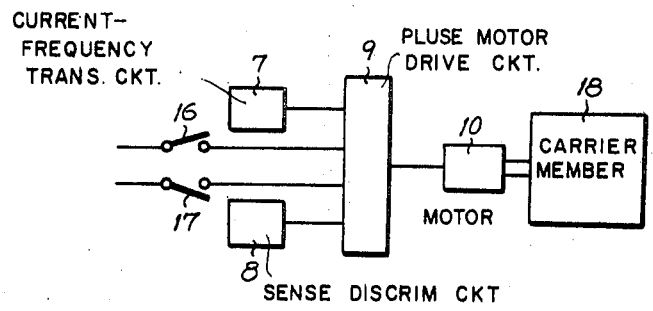
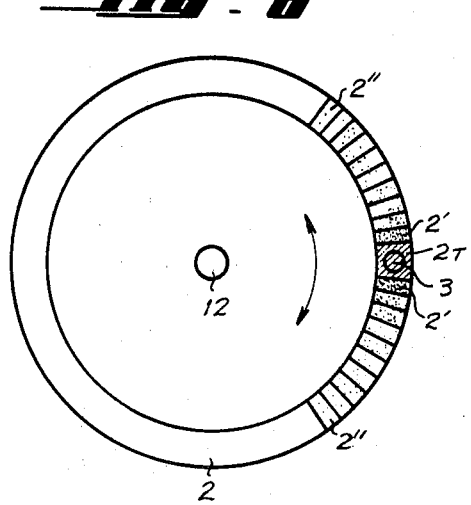
Fig. 8

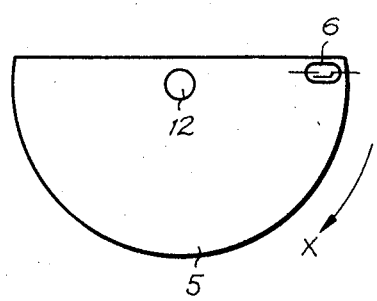
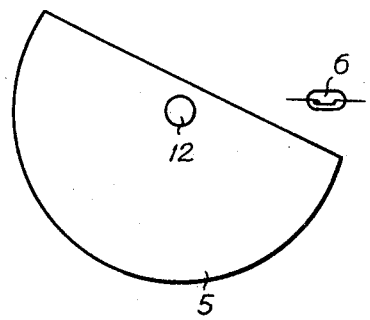
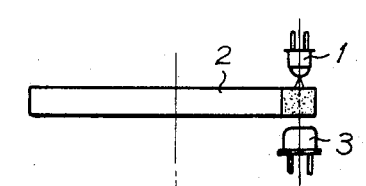
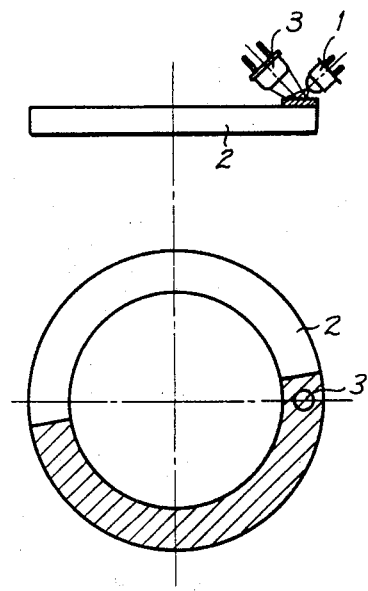

ary required to keep a constant temperature of about 20° C. so as to prevent expansion and contraction.
MANIPULATOR

BACKGROUND OF THE INVENTION

The present invention relates to a manipulator and, more particularly, to a manipulator for a highly accurate mask-dry plate and mask-wafer registration in IC mask printing apparatus and IC wafer printing apparatus for semi-conductor industry.

Conventional manipulators carry out mask-dry plate and mask-wafer registration operation in mechanical manner. A typical example of this is the pantagraph system consisting of a parallel link means. The disadvantage of such mechanical system will be described herebelow with respect to the above-mentioned pantagraph system.

In FIG. 1, let a point P be fixed, and consider the movement of points Q and O which are on a straight line passing through the point P. As the point O moves to O', the point Q moves to Q' and points $O_1$ and $O_2$ move to $O'_1$ and $O'_2$, respectively. Since four straight line segments here constitute a parallelogram, $\overline{OO_2}$ and $\overline{O_1O_3}$ and also $\overline{O'O'_2}$ and $\overline{O'_1O'_3}$ are parallel with each other respectively.

Since $< O'O'_2P = < O'_5O'_1P$ and $$\overline{O'O'_2}/\overline{O'_2P} = \overline{OO_2}/\overline{O_2P} = \overline{QO_1}/\overline{O_1P} = \overline{Q'O'_1}/\overline{O'_1P}$$

$\Delta PO'O'_2$ is similar to $\Delta PQ'O'_1$. Accordingly, the points P, Q and O are always on one and the same straight line. Thus, it is well known that the curves described by the points Q and O which are moving with respect to the fulcrum P are similar figures and the ratio of similitude is:

$$\gamma = \overline{PO_2}/\overline{PO_1}$$

In mechanical manipulators, the value of the above $\overline{PO_2}$ is practically limited so that the value of the ratio of similitude ($\gamma$) is at most 100~150. Accordingly, for mask-dry plate and mask-wafer operations which require registrations less than 1 $\mu$m, the movement OO' of FIG. 1 is extremely small so that undesirable result is produced. When the ratio of similitude $\gamma$ is set to 1,000~1,500, and it is intended to carry out registration less than 1 $\mu$m, then unless provisional positioning of mask-dry plate and mask-wafer members is made within the range of several $\mu$m, the aforementioned movement OO' becomes extremely great and undesirable result is obtained. It is, however, practically impossible to carry out provisional mask-dry plate and mask-wafer positioning of several $\mu$m.

The operator of a mechanical manipulator is positioned very near the mask-dry plate and mask-wafer members so that it is impossible to avoid the evident influence of dust and other undesirable foreign particles produced from the clothes, the skin, the hair, etc., of the operator on the accuracy, the yield, the cost and the efficiency of operation of the end product. For retaining the accuracy of visual registration, it is generally required to keep a constant temperature of about 20° C. so as to prevent expansion and contraction.

The operator carries out mask-dry plate and mask-wafer visual registration under the safety light permitted for dry plates and wafers (provided with resist film). As safety lights there are used red safety light for photographic use and yellow safety light for resist wafers. The eyes of the operator are very much fatigued with this operation.

Since it is in the X-Y direction (X and Y are perpendicular axes) that registration can be made with pantagraph system, in an annular ($\theta$) direction it is necessary to provide a screw pair such as bolt and nut or an engagement such as worm and worm wheel provided with both coarse and fine adjustments. As the registration system of X-Y direction is entirely different from that of $\theta$ direction and also the manner of coarse adjustment is entirely different from that of fine adjustment, it is impossible to carry out simultaneous registration in X-Y and $\theta$ directions. Further, the registration operation with a mechanical manipulator has a disadvantage that it is complicated in manipulation and takes much time.

SUMMARY OF THE INVENTION

The present invention provides a novel manipulator which eliminates the above-mentioned disadvantages of mechanical manipulators and which introduces an electro-optical system and a non-contacting driving system adopting speed control so that the operation is enabled to make registration operations in a simple manner simultaneously in both X-Y and $\theta$ direction with high accuracy of less that 0.5 $\mu$m.

With the manipulator according to the present invention, due to adoption of speed control registration can be carried out in a short time with high accuracy even if the relative positions of mask-dry plate and mask-wafer are largely out of registration. Further use of a monitor television enables the operator to make remote control so that the influence of dust and foreign particles from the operator is eliminated and the labor of the operator is reduced. These are significant features of the present invention.

Briefly an embodiment of the present invention is in a manipulator and includes a movable carriage. At least one light source and a plurality of light sensing elements are provided. First and second pairs include at least one light source and one of the light sensing elements. Light from the light source passes to the light sensing element in the corresponding pair. Also included is a light modulator. The light modulator has a first means for modulating light from the at least one light source as it passes to the corresponding light sensing element in the first pair. The light modulator also has a second means for modulating the light from the light source to the corresponding sensing element in the second pair. The first modulating means passes an increasing amount of light between the corresponding source and the sensing element pair, moving in one direction along a first axis in a plane. The second modulating means passes an increasing amount of light between the corresponding light source and the sensing element pair in one direction along a second axis in the same plane. The first and second axes are at right angles. Means is provided for relatively moving the light modulator and pairs, thereby producing a signal from the sensing element in each of the pairs corresponding to the relative position between the light modulator and the corresponding pair. First means is provided for moving the carriage in a first direction and at a speed corresponding to the signal from the first pair. Second means is provided for moving the carriage in a second direction and at a speed corresponding to the signal from the second pair.

BRIEF DESCRIPTION OF THE DRAWINGS

FIG. 3 is a block diagram of an X-Y manipulator which utilizes the arrangement according to the present invention;

FIGS. 7, 8, and 9a and 9b are sectional views and a top plan view of the essential part of another example of an angle ($\theta$) manipulator;

FIG. 10 shows a plan view of an alternate embodiment of the X-Y manipulator filter wherein the filter is a reflective type of filter;

FIG. 11 shows a plan view of an alternate angle ($\theta$) manipulator filter wherein the filter is a transmissive type and the transmissivity varies abruptly for "ON-OFF" control;

FIG. 12 shows a plan view of an alternate angle ($\theta$) manipulator filter of the reflective type in which the reflectivity varies abruptly for "ON-OFF" control; and FIG. 13, including

DESCRIPTION OF THE PREFERRED EMBODIMENT

Figure 1:
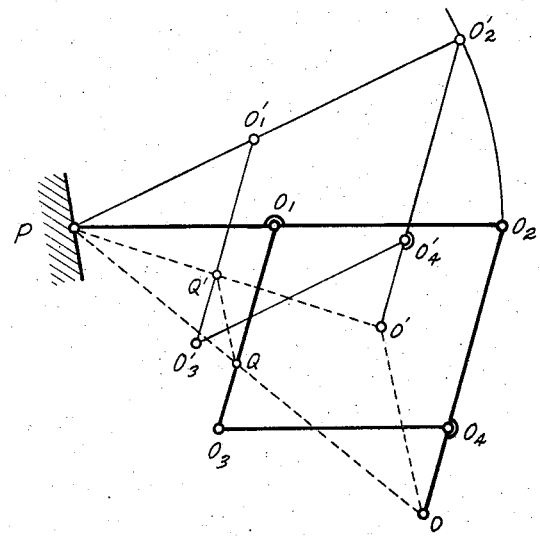
FIG. 1 shows the fundamental structure of a conventional manipulator.
Figure 2:
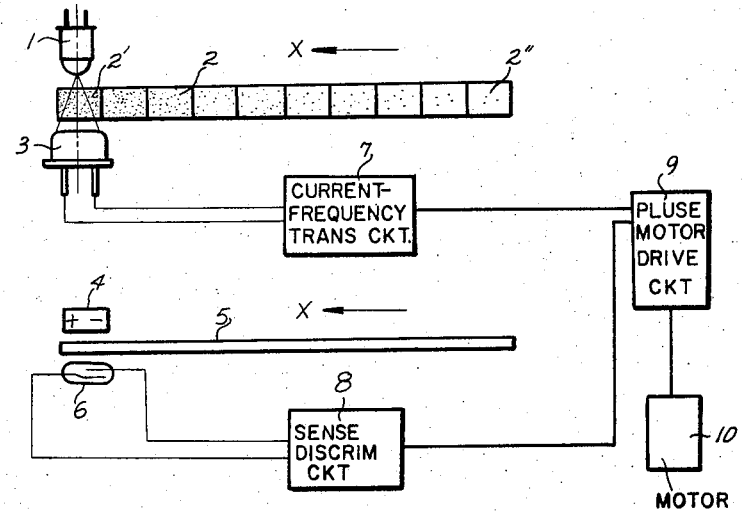
FIG. 2 illustrates the principle of the arrangement according to the present invention.

FIG. 2 illustrates the principle of the present invention. There are provided a semi-permanent light source 1 such as a fixed light emission diode, an optical filter 2 which is perpendicular to the optical axis and can be moved in horizontal direction and a light receiving element 3 which is fixed opposite to the light source 1 with the filter 2 therebetween and which is so arranged as not to be under the influence of other light. As described hereinafter, the filter may take on a number of different forms referred to broadly as a light modulating means. A fixed permanent magnet 4 is provided and opposite to this fixed permanent magnet 4 there is provided a lead switch 6 and further between the fixed permanent magnet 4 and the lead switch 6 there is provided a magnetic shield plate 5 which is so arranged as to be able to move in horizontal direction. The filter 2 and the magnetic shield plate 5 are so arranged as to move the same distance in the same direction. A conventional current-frequency transformation circuit 7 is provided for transforming the photocurrent obtained from the light receiving element 3 into pulses whose frequency is proportional to the value of said photocurrent. A sense discrimination circuit 8 senses the ON and OFF condition of the lead switch 6. A pulse motor driving circuit 9 drives a pulse motor 10 according to the signals from the current-frequency transformation circuit 7 and the sense discrimination circuit 8.

The light from the light source 1 passes through the filter 2 and reaches the light receiving element 3. Now, the filter 2 is so arranged that the photocurrent of the light receiving element 3 due to light passing through the portion 2'' of the filter 2 which has been horizontally moved in the direction of the arrow X is just ten times the photocurrent of the light receiving element 3 due to light passing through the portion 2' of the filter 2 in the illustrated position. The filter 2 is further so arranged that in the portion between the portions 2' and 2'', the rate of transmission varies linearly and continuously or in uniformly stepped manner. When the current-frequency transformation circuit 7 has the maximum pulse frequency range of one order (e.g., the portion 2'' has a pulse number which is ten times that of the portion 2') and the rate of transmission varies continuously within one order, or when sufficient steps of rate of transmission are included in the effective light receiving area of the light receiving element, then the number of pulses can be varied continuously. Now, as mentioned above, the filter 2 and the magnetic shield plate 5 move in mutually opposed relative positions. When the filter 2 is in such a position that either the portion 2' or the portion 2'' is in registration with the light source 1 and the light receiving element 3, the magnetic field of the permanent magnet 4 is blocked by the magnetic shield plate 5 so that the lead switch 6 remains "OFF". Logic of the circuitry is so arranged (as explained in more detail hereafter) that, when an "OFF" signal from the lead switch 6 is applied to the sense discriminating circuit 8, the photocurrent obtained from the light receiving element 3 is current-frequency transformed and a normal or reverse rotation signal is applied to the pulse motor driving circuit 9. When an "ON" signal is applied by lead switch 6 the photocurrent of the light receiving element 3 is not current-frequency transformed and no rotation sense signal is applied to the pulse motor driving circuit 9. Thus, sense discrimination can be automatically carried out. The pulse motor driving circuit 9 drives the pulse motor 10 when it receives pulses from the current-frequency transformation circuit 7 and a signal from the sense discriminating circuit 8. In actual manipulators, a plurality of the above-mentioned means are combined. Description of this will be given herebelow.

FIG. 3 illustrates the principle of an X-Y manipulator (registration in X-Y direction). Description of means having the same numerals as FIG. 2 is omitted.

A constant voltage circuit 11 is provided for keeping the brightness of the light source 1 constant. A filter 2 and a magnetic shield 5 are fixed to a shaft 12 so as to move in the same direction and the same distance. In the filter 2, the portion $2_T$ transmits no light at all, the portion 2' transmits a small amount of light from the light source 1, and the portion 2'' transmits the light from the light source 1 by an amount which is just ten times that of the portion 2'. The portion of the filter 2 which is in between the portions 2' and 2'' is so arranged that the transmitted light amount varies continuously or stepwise. A spring 13 is so arranged that unless an external force is applied, the position of the center of the shaft 12 is always at equal distance from the centers of light receiving elements 3-1 and 3-2. In the illustrated state, the photocurrents of the light receiving elements 3-1 and 3-2 are $O_1$ and, since the magnetic field of the permanent magnet 4 is blocked by the magnetic shield plate 5, the lead switches 6-1 and 6-2 are "OFF". Accordingly, there is no input to the current-frequency transformation circuit 7 and the sense discrimination circuit 8 so that the pulse motor driving circuit 9 does not operate.

If the shaft 12 is moved in the direction of the arrow X so that the portion 2' of the filter 2 is brought to just over the light receiving element 3-1, then the light from the light source 1 passes through the portion 2' and reaches the light receiving element 3-1 and produces a photocurrent of a certain value (for example, A). On the other hand, the portion $2_T$ of the filter 2 moves out from the light path of the light source 1 so that in the light receiving element 3-2 which is positioned on the opposite side of the shaft 12, there is produced a photocurrent which is more than ten times the photocurrent A obtained from the light receiving element 3-1. At this time, the lead switch 6-1 is "OFF". Since the magnetic shield plate 5 moves out from the magnetic field of the permanent magnet 4, the lead switch 6-2 is "ON". Accordingly, the photocurrent A from the light receiving element 3-1 and the photocurrent of more than 10A from the light receiving element 3-2 are applied as inputs to the current-frequency transformation circuit 7, and an "OFF" signal from the lead switch 6-1 and an "ON" signal from the lead switch 6-2 are applied as inputs to the sense discrimination circuit 8. Logic of the circuitry is so arranged that, when an "ON" signal from the lead switch 6-2 is applied to the sense discrimination circuit 8, the photocurrent of the light receiving element 3-1 which is oppositely positioned relative to the shaft 12 is current-frequency transformed and a normal rotation signal is applied to the pulse motor driving circuit 9, and when an "ON" signal from the lead switch 6-1 is applied to the sense discrimination circuit 8, the photocurrent of the light receiving element 3-2 is current-frequency transformed and a reversed rotation signal is applied to the pulse motor driving circuit 9. Thus, in the aforementioned case, since the lead switch 6-2 is "ON", a normal rotation signal from the sense discrimination circuit 8 is applied to the pulse motor driving circuit 9 and the photocurrent A of the light receiving element 3-1 is transformed by the current-frequency transformation circuit 7 into pulses having a frequency which is proportional to the photocurrent A and is applied to the pulse motor driving circuit 9. If the pulse frequency is P, the pulse motor 10 is driven by the pulse motor driving circuit 9 in the normal rotating direction with frequency P.

If the shaft 12 is further moved in the direction of the arrow X so that the portion 2″ of the filter 2 is brought to just over the light receiving element 3-1, then there is produced a photocurrent whose value is ten times that of the photocurrent A produced when the portion 2′ is over the light receiving element 3-1, that is, a photocurrent of the value of 10A. At this time, the photocurrent produced by the light receiving element 3-2 remains of a certain value which is greater than 10A. Also, the lead switch 6-1 remains "OFF", and the lead switch 6-2 remains "ON". Accordingly, the frequency of the output pulses from the current-frequency transformation circuit 7 is 10P, and the output signal from the sense discrimination circuit 8 represents instructions of normal rotation. Thus, the pulse motor driving circuit 9 causes the pulse motor 10 to make normal rotation with pulse frequency 10P.

The light transmission of the portion of the filter 2 which is between the portions 2′ and 2″ is arranged as mentioned before so that the pulse frequency can have any value between P and 10P with the filter 2 correspondingly positioned. Thus, the rotation speed of the pulse motor 10 can be varied continuously.

In order to register in the X-Y directions, it is necessary to discriminate between the +X, −X, +Y, and −Y senses. For this purpose, two sets of the apparatus shown in FIG. 3 are combined perpendicular to each other and are parallely driven through respective independent control circuits. Considering a two-dimensional X-Y coordinate plane which is perpendicular to the central axis of the shaft 12 which is at equal distance from each of the two light receiving elements, the displacement of the shaft 12 enables the operator to discriminate between the +X, −X, +Y, −Y senses and the changed position of the shaft 12 enables the operator to obtain pulse frequencies for the X and Y directions. The sense of movement of the shaft 12 is sense discriminated and thus determines the sense of rotating movement of X direction and Y direction pulse motors 10. Movement of the shaft 12 produces X direction and Y direction pulse frequencies which are proportional to the distance of movement, thereby determining the rotation speeds of the X direction and Y direction pulse motors. The X direction and Y direction pulse motors are provided with, for example, fine adjustment carrier members (not shown) so that these fine adjustment carrier members move in entirely the same sense as that of the movement of the shaft 12 with a speed which is proportional to the distance of the movement of the shaft 12.

Figure 4:
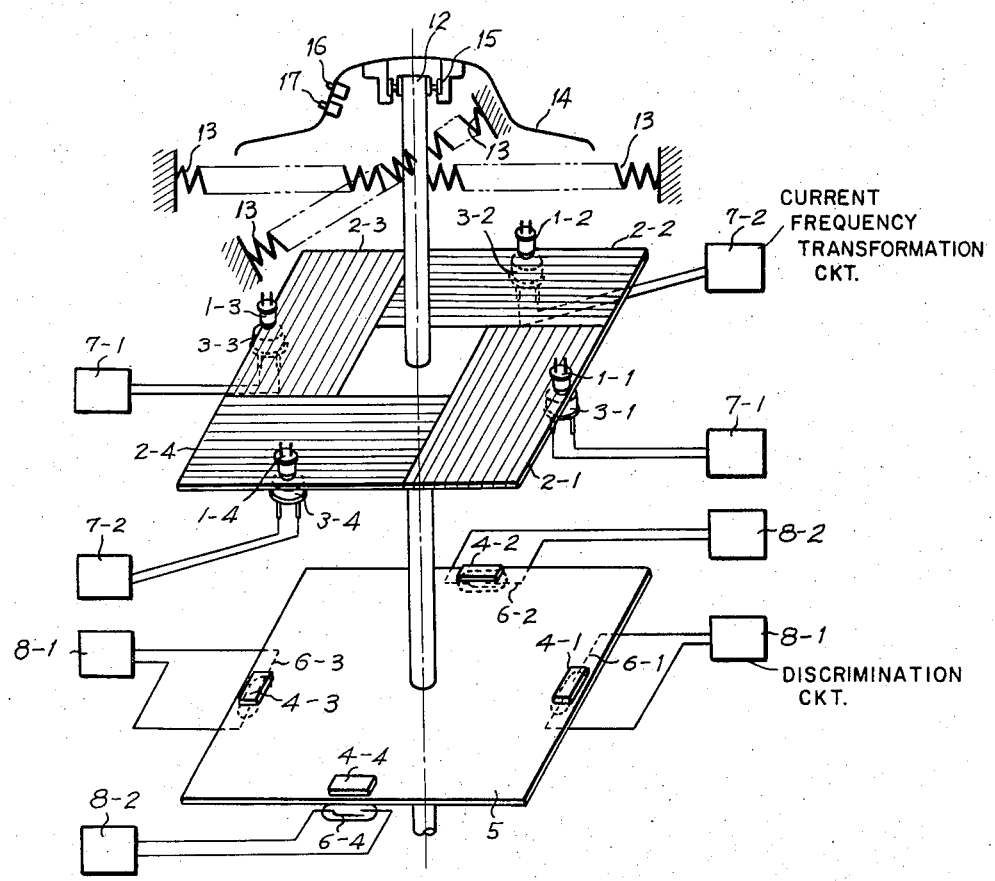
FIGS. 4a, 4b, 4c, FIGS. 5a, 5b, and FIGS. 6a and 6b are a perspective view and top plan views of essential parts of an example of X-Y manipulator.
Figure 4:
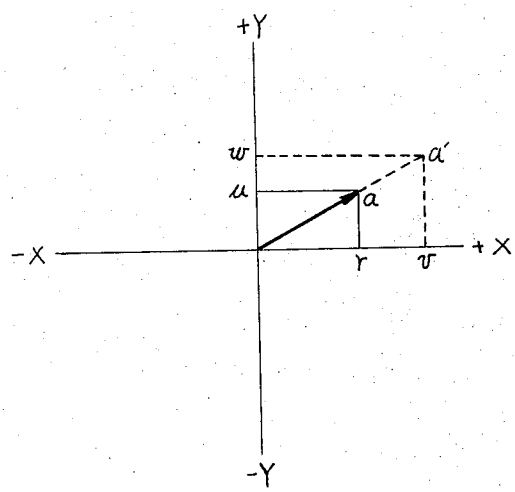
Figure 4C:
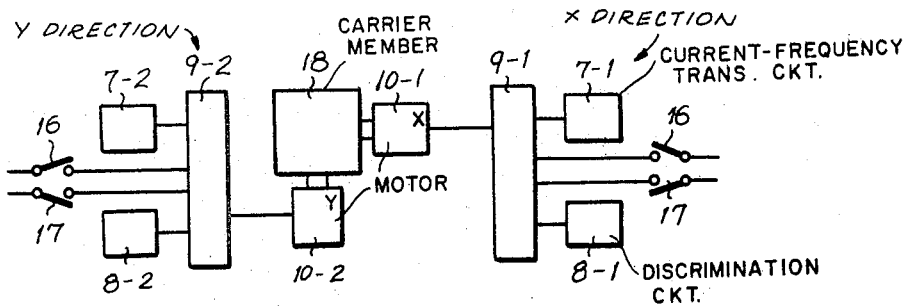

FIGS. 4a, 4b and 4c show one example of the X-Y manipulator. A rotatable knob 14 of the X-Y manipulator engages a shaft 12 through a bearing 15. Origin returning springs 13 are so provided that, unless an external force is applied, the central axis of the shaft 12 passes through a point (herein referred to as "origin") which is always at equal distance from light receiving elements 3-1, 3-2, 3-3, and 3-4 and the shaft 12 does not rotate with rotation of the knob 14. A rectangular coordinate system is established on a plane which passes the origin and is perpendicular to the central axis of the shaft 12 as seen in FIG. 4b with coordinate axes +X, −X; +Y, −Y. A micro-switch 16 in the knob 14 causes "ON" and "OFF" operations of an X direction pulse motor driving circuit 9-1 and a Y direction pulse motor driving circuit 9-2 which will be described later. A micro-switch 17 applied one pulse to an X direction pulse motor 10-1 and a Y direction pulse motor 10-2 quite independently of each other, thus making one pulse drive possible. Shown in the drawing are light emission diodes 1-1, 1-2, 1-3 and 1-4 of equal characteristic, filters 2-1, 2-2, 2-3 and 2-4 of equal characteristic, silicon light receiving elements 3-1, 3-2, 3-3 and 3-4 of equal characteristic, permanent magnets 4-1, 4-2, 4-3 and 4-4 of equal characteristic, lead switches 6-1, 6-2, 6-3 and 6-4 of equal characteristic, a magnetic shield plate 5, and X direction current frequency transformation circuit 7-1, a Y direction current frequency transformation circuit 7-2, an X direction discrimination circuit 8-1, a Y direction discrimination circuit 8-2. An X direction pulse motor driving circuit 9-1 (FIG. 4c) operates due to input signals from the X direction current-frequency transformation circuit 7-1 and the X direction discrimination circuit 8-1; and a Y direction pulse motor driving circuit 9-2 operates due to input signals from the Y direction current-frequency transformation circuit 7-2 and the Y direction discrimination circuit 8-2. A fine adjustment carrier member 18 for wafers, dry plates and masks is driven by an X direction pulse motor 10-1 and a Y direction pulse motor 10-2.

The light emission diodes are each associated with a light receiving element thus forming pairs as follows: 1-1 and 3-1; 1-2 and 3-2; 1-3 and 3-3; 1-4 and 3-4.

With the arrangement according to the present invention as mentioned above, operations according to the principle illustrated by FIGS. 2 and 3 can be carried out in the following manner: If the knob 14 is brought to an arbitrary position of the rectangular coordinate plane, senses and speeds corresponding to the coordinate value of the central axis of the knob 14 are given to the X direction pulse motor 10-1 and the Y direction pulse motor 10-2.

Now a detailed description of the function of the example as mentioned above will be given below in conjunction with FIGS. 5 and 6. FIG. 5 shows the filters 2-1, 2-2, 2-3 and 2-4 and the light receiving elements 3-1, 3-2, 3-3 and 3-4. FIG. 6 shows the arrangement of the magnetic shield plate 5 and the lead switches 6-1, 6-2, 6-3 and 6-4.

Figure 5A:
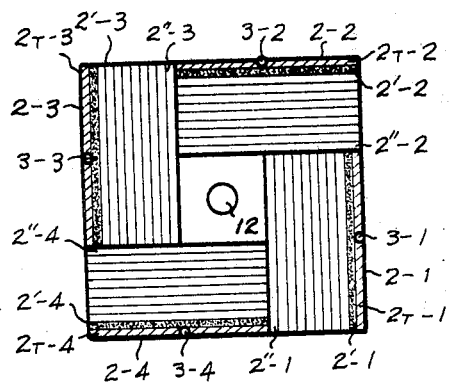
Figure 5B:
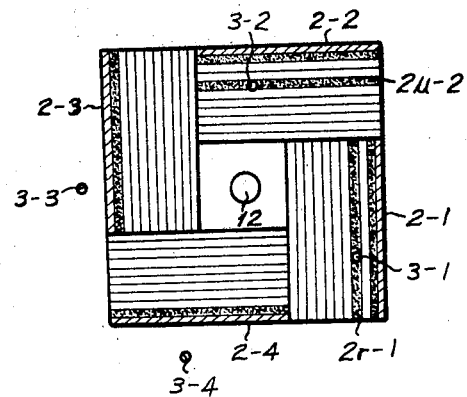
Figure 6A:
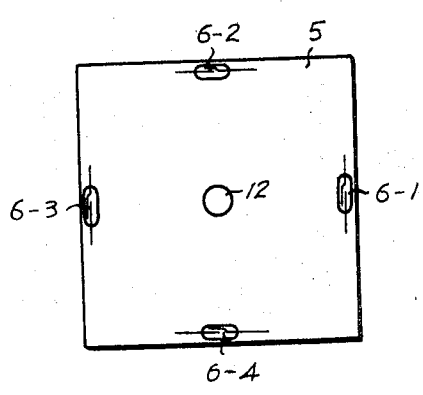
Figure 6B:
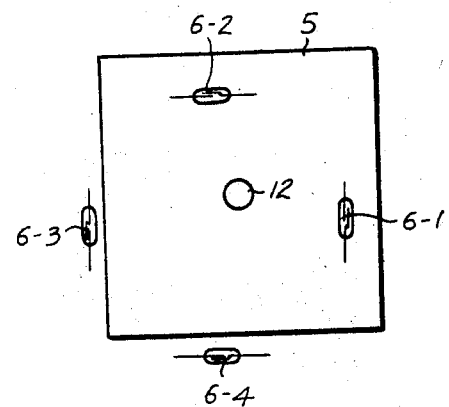

FIGS. 5a and 6a show a state where the knob 14 of FIG. 4 has not been moved, that is, the shaft 12 is positioned at the origin; while FIGS. 5b and 6b show a state where the knob 14 has been moved to a position "a" $(r, u)$ in the first quadrant of the rectangular coordinate system. The filters 2-1, 2-2, 2-3 and 2-4 are of rectangular shape for movement in X-Y directions, and are provided with rate of transmission which varies continuously or stepwise as shown in FIGS. 2 and 3. In the filter, the portions $2_T$-1, $2_T$-2, $2_T$-3 and $2_T$-4 do not transmit at all the light from the light sources 1-1, 1-2, 1-3 and 1-4, respectively, the portions 2'-1, 2'-2, 2'-3, and 2'-4 transmit so small amount of light that the photocurrent obtained from the respective light receiving element is of a certain value A, the portions 2''-1, 2''-2, 2''-3 and 2''-4 transmit such amount of light that the resulting photocurrent is of a value which is just ten times that of the photocurrent due to the portions 2'-1, 2'-2, 2'-3 and 2'-4, that is, of the value of 10A.

In FIGS. 5a, just over the light receiving elements 3-1, 3-2, 3-3 and 3-4 there are positioned respectively filter portions $2_T$-1, $2_T$-2, $2_T$-3 and $2_T$-4 which do not transmit light at all so that the photocurrent of each light receiving element is 0. In FIG. 6a, all of the lead switches 6-1, 6-2, 6-3 and 6-4 are "OFF" due to blocking of the magnetic shield plate 5, so that if the microswitch 16 is made "ON", the X direction pulse motor 10-1 and the Y direction pulse motor 10-2 do not operate.

Now, when the center of the knob 14 is moved to a point "a" $(r, u)$, as seen in FIG. 5b, the photocurrent of the light receiving element 3-1 is of a certain value R, the photocurrent of the light receiving element 3-2 is of a certain value U, and the photocurrents of the light receiving elements 3-3 and 3-4 are of values which are greater than 10A, the values R and U being within the following ranges:

$$A \leq R \leq 10A, \qquad A \leq U \leq 10A.$$

In FIG. 6b, the lead switches 6-1 and 6-2 are magnetically shielded and accordingly are "OFF", while the lead switches 6-3 and 6-4 are "ON" since the magnetic shield plate 5 escapes from the magnetic field of the permanent magnets 4-3 and 4-4. Arrangement is so made that when the lead switch 6-3 is "ON" the photocurrent obtained from the light receiving element 3-1 is current-frequency transformed with +X (normal rotation), and when the lead switch 6-1 is "ON", the photocurrent obtained from the light receiving element 3-3 is current-frequency transformed with −X (reversed rotation); and further, logic circuit arrangements are established in the same manner for the light receiving elements 3-2 and 3-4. At the position of the point "a" $(r, u)$, the lead switches 6-3 and 6-4 are "ON" so that sense discrimination of +X can be carried out in the X direction discrimination circuit 8-1 and sense discrimination of +Y can be carried out in the Y direction discrimination circuit 8-2. The X direction current-frequency transformation circuit 7-1 current-frequency transforms a photocurrent R obtained when a light which has passed through the portion $2_r$-1 of th filter 2-1 reaches the light receiving element 3-1, and the Y direction current-frequency transformation circuit 7-2 current-frequency transforms a photocurrent U obtained when a light which has passed through the portion $2_u$-2 of the filter 2-2 reaches the light receiving element 3-2. At this time, if the numbers of the respective corresponding pulses are R' and U', then between the photocurrents and the pulse frequencies there exists the following relation:

$$U/R = U'/R'$$

It is necessary to put the X direction pulse motor 10-1 and the Y direction pulse motor 10-2 into operation only when mask-dry plate and mask-wafer registration operations are to be made. For this reason, for the X direction pulse motor driving circuit 9-1 and for the Y direction pulse motor driving circuit 9-2 there is provided a simple "ON-OFF" switch circuit 16 as shown in FIG. 4c. When the switch circuit 16 is closed or "ON", a control signal is applied to pulse motor driving circuits 9-1 and 9-2 (from a source not shown), causing the pulse motor driving circuits 9-1 and 9-2 to drive the respective pulse motors 10-1 and 10-2. Thus, when the micro-switch 16 is made "ON", the fine adjustment carrier member 18 moves, due to the driving action of the X direction and the Y direction pulse motors 10-1 and 10-2 and with relation to the point "a" $(r, u)$ in the direction of $$\theta = \tan^{-1} U'/R'$$

and with a speed $$K \sqrt{(U')^2 + (R')^2} \quad (K: \text{a constant})$$

If the knob 14 is further moved to a point "a'" $(v, w)$ which is on the extension of a straight line segment connecting the point "a" to the origin, the light receiving element 3-1 produces a photocurrent V which is greater than R, and the light receiving element 3-2 produces a photocurrent W which is greater than U. Thus, the values V' and W' resulting from current-frequency transformation in the same manner as before satisfy the following relations: $U/R = U'/R' = V'/W'$ $$K \sqrt{(U')^2 + (R')^2} < K \sqrt{(V')^2 + (W')^2}$$

so that the fine adjustment carrier member 18 moves with greater speed.

The switch circuit 17 is connected to a source of control signals (not shown) and is so arranged that when actuated, one pulse is given by the pulse motor driving circuits to the X direction and the Y direction pulse motors 10-1 and 10-2 only when at least one of the lead switches 6-1, 6-2, 6-3 and 6-4 are "ON". In the cases of the point "a" $(r, u)$ and the point "a'" $(v, w)$, the lead switches 6-3 and 6-4 are "ON" so that in the X direction and the Y direction discrimination circuits 8-1 and 8-2 in the senses +X and +Y are discriminated. Due to actions of the X direction and the Y direction pulse motor driving circuits 9-1 and 9-2, the X direction and the Y direction pulse motors 10-1 and 10-2 operate one step each in the senses of +X and +Y respectively. As a result, the fine adjustment carrier member 18 moves in the sense of tan $\theta = 1/1$, that is, $\theta = 45°$, in the first quadrant.

FIG. 7 shows one example of an angle ($\theta$) manipulator. A manipulating knob 14 of the $\theta$ manipulator, micro-switches 16 and 17 and a shaft 12 fixed to the center of the knob 14. Arrangement is so made that, unless a rotating torque is exerted on the knob 14, the shaft 12 is urged by springs 13 so as to return to a prefixed position. A filter 2 causes the transmitted light amount to vary continuously or stepwise. A light source 1 and a light receiving element 3 are oppositely positioned with the filter positioned therebetween and at a constant distance from the central axis of the shaft 12. Further shown in the drawing are a permanent magnet 4, a magnetic shield plate 5 for blocking the magnetic field of the permanent magnet 4 and a lead switch 6. A constant voltage circuit 11 energizes the light source 1, preferably a light emission diode, causing it to emit light. This light passes through the filter 2 and reaches the light receiving element 3. The resulting photocurrent is current-frequency transformed by a current-frequency transformation circuit 7. Through "ON" or "OFF" of the lead switch, the sense of rotation is discriminated by a sense discrimination circuit 8 and the corresponding input is applied to the pulse motor driving circuit 9. The pulse motor driving circuit 9 drives the pulse motor 10 with a speed and a sense of rotation which are determined by the pulse frequency received from the current-frequency transformation circuit 7 and the sense discrimination signal received from the sense discrimination circuit 8. For the intended object, the pulse motor 10 may be drivingly connected to a rotatable carrier member 18. It is necessary to rotate the carrier member 18 only when mask-dry plate and mask-wafer registration operations are carried out. Accordingly, just in front of the pulse motor driving circuit 9 there is provided a simple "ON-OFF" switch circuit 16 in such a manner that only when the switch circuit 16 is "ON", the pulse motor 10 is driven by the pulse motor driving circuit 9. Arrangement is further so made that when the switch circuit 17 is "ON", one pulse can be given to the pulse motor 10, and the sense of rotation is determined by the sense discrimination circuit 8.

According to the above-mentioned arrangement, the pulse frequency obtained by rotating the knob 14 about its center and the rotation sense discriminating signal are given to the pulse motor 10 and an operation according to the principle as shown in FIG. 2 is carried out.

In FIG. 8 there is shown the relative positions of a filter 2 which is rotatable in the direction of the arrows about the shaft 12 of the $\theta$ manipulator and a fixed light receiving element 3. The portion $2_T$ of the filter 2 transmits no light at all, the portion 2' transmits such small amount of light that the photocurrent of the light receiving element 3 is of a certain value A, and the portion 2" transmits such amount of light that the resulting photocurrent is ten times that of the portion 2', that is, of the value 10A. The photocurrent resulting from the filter portion ranging from the portion 2' to the portion 2" varies correspondingly from A to 10A in continuous manner. If the photocurrent A causes the current-frequency transformation circuit 7 to produce a pulse frequency P', the arrangement can provide any pulse frequency within the range of P'~10P''. Thus, it is possible to control the number of pulses per unit time given to the pulse motor 10, and accordingly to control the rotating speed of the pulse motor 10.

FIG. 9 shows the relative positions of a magnetic shield plate 5 and a lead switch 6. In FIG. 9a, the knob 14 is in its normal position and at this time the lead switch is "OFF". In FIG. 9b, the knob 14 has been rotated in the direction (sense) of the arrow X, and at this time, the lead switch 6 is "ON" so that the sense of the rotation can be readily discriminated.

FIG. 10 shows the essential part of another embodiment of the present invention. A filter 2 is shown representing the X or Y filter which reflects the light from a fixed light source 1 varying the reflected light amount continuously or stepwise. The filter 2 has its reflectivity incrementally changed across its surface. A light receiving element 3 is so positioned in the light path of the reflected light as to be at a right angle to the optical axis of the reflected light. As a result, the photocurrent produced by the light receiving element is varied in continuous or approximately continuous manner. By current-frequency transforming the photocurrent, an operation can be carried out according to the principle of the present invention as shown in FIG. 2.

FIGS. 11 and 12 show an alternate embodiment of the $\theta$ manipulator filters in which a light emission diode 1 and a light receiving element 3 are provided with a filter 2. FIG. 11 shows a reflective filter 2 and FIG. 12 shows a transmissive filter 2. The filters are arranged so that the amount of transmitted light or reflected light varies abruptly and sense discrimination of "ON-OFF" is carried out by means of the difference of the photocurrent from the light receiving element 3.

Figure 13A:
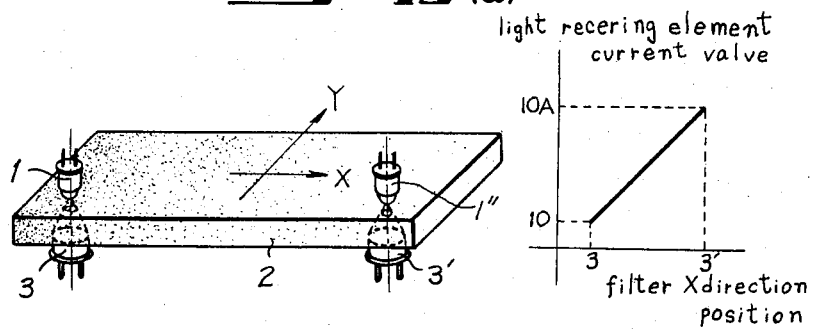
FIGS. 13a, 13b and 13c, shows the details of various filters described herein.
Figure 13B:
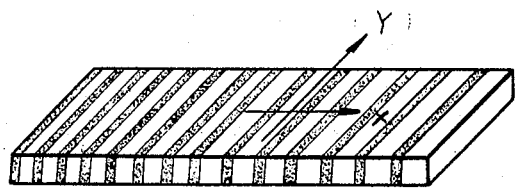
Figure 13C:
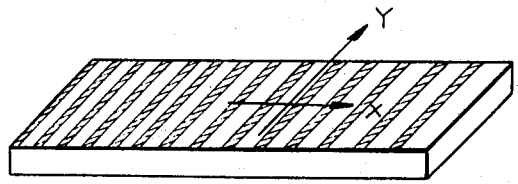

FIGS. 13a, 13b and 13c illustrate the detail of the above-mentioned filters. FIG. 13a shows a filter for the object of the present invention made of photographic dry plate or photographic film. With a combination of the light emission diode 1 and the light receiving element 3, as the light receiving element moves from the position 3 to the position 3' relative to the filter 2, that is, in the direction X, the transmitted light amount increases ten times, while in the direction Y, the transmitted light amount remains the same. The graph shows the relation between the position in X direction relative to the filter 2 and the corresponding current value of the light receiving element, and, as seen, this relation is proportionality. Generally, the transmission density of photographic film or photographic dry plate is represented by the common logarithm of the reciprocal of the rate of transmission T: $\log_{10} 1/T$. It is difficult to vary this filter density continuously or stepwise in such a manner that proportionality is established between the X direction position relative to the filter and the corresponding value of the current of the light receiving element as shown in the graph of FIG. 13a. Under these conditions, with a light receiving element of somewhat larger area, the following arrangement is made: as shown in FIG. 13b, the widths of black-white stripes are varied to vary the effective light transmission area in X direction. In this manner, it is easy to establish proportionality between X direction position relative to the filter and the corresponding current value of the light receiving element and further to make the characteristics of the filters uniform.

FIG. 13c shows a reflective filter which is made in the following manner. A hard coating of chromium is made over a glass plate and coated with light-sensitive resin. After light exposure and development, etching of the chromium layer is made to provide a finished filter. In the drawing, the hatched area shows the chromium layer attached by evaporation. The pattern is of the same configuration as that of FIG. 13b. Proportionality is established between the X direction position relative to the filter and the current value obtained when the light of the light source reflected by the filter reaches the light receiving element. In the Y direction, the current value remains unchanged.

Figure 14:
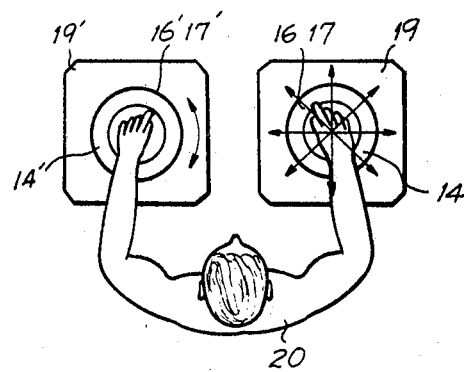

FIG. 14 shows the practical handling of the manipulator according to the present invention. In the drawings, there are shown fixed carriers 19 and 19' for carrying, attached to them, X-Y and $\theta$ manipulators, micro-switches 16 and 16' for driving pulse motors for necessary time duration for mask-dry plate and mask-wafer registrations, and micro-switches 17 and 17' for giving one pulse to the pulse motor, thus making it possible to apply one pulse. The operator 20 moves with his right hand the knob 14 of the X-Y manipulator to an arbitrary position in the directions of the arrows and actuates the micro-switch 16 "ON" to cause mask-dry plate and mask-wafer X-Y direction registration. The operator 20 further rotates with his left hand the knob 14' of the $\theta$ manipulator in the directions of the arrows and actuates the micro-switch 16' "ON" so as to cause mask-dry plate and mask-wafer $\theta$ direction registration. Thus, it is possible to carry out the operation simultaneously with both hands.

With conventional mechanical manipulators, high accuracy mask-dry and mask-wafer registrations are not compatible with reduced movement of the knob of the manipulator. For this reason, highly accurate mask-dry plate and mask-wafer positionings have been practically impossible, and for mechanical reasons of the arrangement, it has been difficult to carry out positioning when there are large mask-dry plate and mask-wafer relative position differences. Further, with mechanical manipulators, the X-Y direction and the $\theta$ direction registration mechanisms are entirely different from each other and the methods of coarse and fine adjustments are entirely different from each other, so that there are the disadvantages of complicated manipulation and taking much time for registration. With the manipulator of the present invention, however, such drawbacks of mechanical manipulators are eliminated by carrying out the speed control of the pulse motor with an electro-optical method. According to the present invention, registration can be carried out with a high accuracy of less than 0.5 $\mu$m, and in this registrating operation, the movement of the knob of the manipulator may be small so that a miniaturized and light-weight arrangement can be provided.

Further, the manipulator according to the present invention carries out speed control of the pulse motor so that it is characterized in that it can carry out high accuracy registrating operation in a short time even if there are large mask-dry plate and mask-wafer relative position difference. The electro-optical method enables the operator to perform remote control. Thus, with the use of a monitor television camera influence of dust from the operator is eliminated and the labor of the operator is reduced. It is clear that the present invention can be applied not only to IC mask printing arrangement and IC wafer printing arrangement, but also to registrating operations of microscopes, projectors, measuring instruments, etc. and to remote control operations for eliminating influences from the operator. It is possible to use various kinds of D.C. motors instead of pulse motors.

What is claimed is:

1. A manipulator comprising:
   a. a movable carriage;
   b. at least one light source and a plurality of light sensing elements; first and second pairs each comprising said at least one light source and one of said light sensing elements, light from said at least one source passing to the light sensing element in the corresponding pair;
   c. a light modulator comprising
      1. first means for modulating light from said at least one light source to the corresponding light sensing element in the first pair, and
      2. second means for modulating light from said at least one light source to the corresponding sensing element in the second pair, the first modulating means passing an increasing amount of light between the corresponding source and sensing element pair moving, in one direction, along a first axis in a plane, the second modulating means passing an increasing amount of light between the corresponding light source and sensing element pair in one direction along a second axis in the same plane, the first and second axes being at right angles,
   d. means for relatively moving said light modulator and pairs, thereby producing a signal from said sensing elements in each said pair corresponding to the relative position between the light modulator and corresponding pair;
   e. first means for moving such carriage in a first direction and at a speed corresponding to the signal from said first pair; and
   f. second means for moving such carriage in a second direction and at a speed corresponding to the signal from said second pair.

2. A manipulator according to claim 1 wherein said light modulating means comprises means for abruptly and incrementally varying the amount of light passed thereby.

3. A manipulator according to claim 1 wherein said light modulating means each comprises means for continuously varying the amount of light passed thereby.

4. A manipulator according to claim 1 wherein said light modulating means each comprises a light filter for transmitting light therethrough and the light source and sensing element of each pair are on opposite sides of the modulating means.

5. A manipulator according to claim 1 wherein said light modulator comprises a light filter for reflecting light from the surface thereof, the light source and sensing element of each pair being on the same side of said modulating means.

6. A manipulator according to claim 1 wherein said light modulating means each comprise a plurality of different abruptly changing filter areas elongated in said plane, the filter areas within each of said first and second modulating means being elongated in a direction parallel to each other.

7. A manipulator according to claim 1 comprising first means for sensing when said modulator is in a preselected position along said first axis for disabling said first means for moving and second sensing means for sensing when said modulator is in a preselected position along said second axis for disabling said second means for moving.

8. A manipulator according to claim 7 wherein said first and second means each comprise a permanent magnet, a magnetic field responsive switch positioned in the magnetic field of the corresponding magnet, and means connected to said modulating means for magnetically shielding said switch from said permanent magnet when the manipulator is in said preselected position.

9. A manipulator comprising:
   a. a movable carriage;
   b. a plurality of light sources and a plurality of light sensing elements, first and second pairs each comprising at least one light source and at least one light sensing element, light from the source passing to the light sensing element in the corresponding pair;
   c. a light modulator comprising
      1. first means for modulating light from the light source to the corresponding light sensing element in the first pair, and
      2. second means for modulating light from the light source to the corresponding sensing element in the second pair, the first modulating means passing an increasing amount of light between the corresponding source and sensing element pair moving, in one direction along a first axis in a plane, the second modulating means passing an increasing amount of light between the corresponding light source and sensing element pair in one direction along a second axis in the same plane, the first and second axes being at right angles,
   d. means for relatively moving said light modulator and pairs, thereby producing a signal from said sensing elements in each said pair whose magnitude corresponds to the relative position between the light modulator and corresponding pair,
   e. first means for moving such carriage in a first direction and at a speed determined by the frequency of applied pulse signals;
   f. second means for moving such carriage in a second direction and at a speed determined by the frequency of applied pulse signals;
   g. means for applying a pulse signal to said first moving means, having a pulse frequency corresponding to the magnitude of said signal from said first pair; and
   h. means for applying a pulse signal to said second moving means having a pulse frequency corresponding to the magnitude of said signal from said second pair.

10. A manipulator according to claim 9 wherein said first and second moving means comprises a pulse responsive motor.

11. A manipulator comprising:
    a. a movable carriage;
    b. at least one light source and a plurality of light sensing elements, first and second pairs each comprising said at least one light source and one of said light sensing elements, light from said at least one source passing to the light sensing element in the corresponding pair;
    c. a light modulator comprising
       1. first means for modulating light from said at least one light source to the corresponding light sensing element in the first pair, and
       2. second means for modulating light from said at least one light source to the corresponding sensing element in the second pair,
    the first modulating means passing an increasing amount of light between the corresponding source and sensing element pair moving, in one direction, along a first axis in a plane, the second modulating means passing an increasing amount of light between the corresponding light source and sensing element pair in one direction along a second axis in the same plane, the first and second axes being at right angles;
    d. means for relatively moving said light modulator and pairs, thereby producing a signal from said sensing elements in each said pair whose magnitude corresponds to the relative position between the light modulator and corresponding pair,
    e. first means for moving such carriage in a first direction and at a speed determined by the frequency of applied pulse signals;
    f. second means for moving such carriage in a second direction and at a speed determined by the frequency of applied pulse signals;
    g. first means for applying a pulse signal to said first moving means, having a pulse frequency corresponding to the magnitude of said signal from said first pair;
    h. second means for applying a pulse signal to said second moving means having a pulse frequency corresponding to the magnitude of said signal from said second pair; and
    i. first and second switch means for respectively controlling said first and second means for applying pulse signals, and means coupled to the modulating means for actuating said switch means when the modulating means is moved in first and second directions, respectively, with respect to a predetermined position.

12. A manipulator according to claim 11 wherein said switch means each comprise a magnetically operated switch and a magnet means, said actuating means comprising a magnetic shield which is positioned in between the magnetically operated switch and corresponding magnet means of both switch means when both modulating means are in said predetermined position but which is moved so as to expose the switch of a switch means to the magnetic field of the corresponding magnet means when the corresponding modulating means is moved out of said predetermined position thereof.

13. A manipulator comprising:
    a. a movable carriage;
    b. at least one light source and a plurality of light sensing elements, first, second, third and fourth pairs each comprising said at least one light source and one of said light sensing elements, light from said at least one source passing to the light sensing element in the corresponding pair;
    c. a light modulator comprising
       1. first means for modulating light from said at least one light source to the corresponding light sensing element in the first pair, 2. second means for modulating light from said at least one light source to the corresponding sensing element in the second pair,
3. third means for modulating light from said at least one light source to the corresponding light sensing element in the third pair, and
4. fourth means for modulating light from said at least one light source to the corresponding light sensing element in the fourth pair, the first modulating means passing an increasing amount of light between the corresponding source and sensing element pair moving, in one direction, on one side of a point of origin along a first axis in a plane, the third modulating means passing an increasing amount of light between the corresponding source and sensing element pair moving, on one direction on the opposite side of the point of origin along the first axis, the second modulating means passing an increasing amount of light between the corresponding light source and sensing element pair in one direction on one side of a point of origin along a second axis in the same plane, the fourth modulating means passing an increasing amount of light between the corresponding source and sensing element pair moving in one direction on the opposite side of the point of origin along the second axis, the first and second axes being at right angles;
d. means for relatively moving said light modulator and pairs, thereby producing a signal from said sensing elements in each said pair corresponding to the relative position between the light modulator and corresponding pair;
e. first means for moving such carriage in a first direction and at a speed corresponding to the signal from said first and third pairs; and
f. second means for moving such carriage in a second direction and at speed corresponding to the signal from said second and fourth pairs.

14. A manipulator according to claim 13 comprising:

a. first means for sensing relative movement of said modulator from the origin along said first axis on said one side and opposite side;
b. second means for sensing relative movement of said modulator from the origin along said second axis on said one side and opposite side;
c. means responsive to said first sensing means for selecting the signals from either said first or third pair for said first moving means; and
d. means responsive to said second sensing means for selecting the signals from either said second or fourth pair for said second moving means.

* * * * *

8186:DBP

PO-1050
(5/69)

UNITED STATES PATENT OFFICE
CERTIFICATE OF CORRECTION

Patent No. 3,808,485      Dated April 30, 1974

Inventor(s) Teru Sakai et al.

It is certified that error appears in the above-identified patent and that said Letters Patent are hereby corrected as shown below:

Column 1, line 25, instead of "$O'_5O'_1P$" insert -- $O'_3O'_1P$ --.

Column 4, line 42, after "shield" insert -- plate --.

Column 6, line 40, "applied" should read -- applies --.

Column 7, line 36, "FIGS." should read -- FIG. --.

Column 8, line 10, "th" should read -- the --.

Column 11, line 16, "ings" should read -- ing --.

Signed and sealed this 22nd day of October 1974.

(SEAL)
Attest:

McCOY M. GIBSON JR.
Attesting Officer

C. MARSHALL DANN
Commissioner of Patents